United States Patent [19]

McKechnie

[11] 4,251,931
[45] Feb. 24, 1981

[54] TERRAIN VEHICLE SIMULATOR CONTOUR MEASURING AND STORAGE DEVICE

[75] Inventor: John C. McKechnie, Maitland, Fla.

[73] Assignee: The United States of America as represented by the Secretary of the Navy, Washington, D.C.

[21] Appl. No.: 29,223

[22] Filed: Apr. 11, 1979

[51] Int. Cl.³ .............................................. G09B 9/04
[52] U.S. Cl. ....................................... 434/29; 73/146; 434/62
[58] Field of Search .................. 35/11 R, 11 A, 12 N, 35/25; 358/104; 364/853, 856, 805; 73/146; 180/79, 9.2

[56] References Cited

U.S. PATENT DOCUMENTS

| | | | |
|---|---|---|---|
| 3,283,418 | 11/1966 | Brewer | 35/11 R |
| 3,412,481 | 11/1968 | Flower et al. | 35/12 N |
| 3,483,364 | 12/1969 | Leeson | 364/856 |
| 3,718,040 | 2/1973 | Freeman et al. | 73/146 |
| 3,720,007 | 3/1973 | McKechnie et al. | 35/12 N |

*Primary Examiner*—Vance Y. Hum
*Attorney, Agent, or Firm*—R. S. Sciascia; R. W. Adams; D. S. Kalmbaugh

[57] ABSTRACT

A terrain vehicle contour measuring and storage system is disclosed, for simulating a carrier vehicle, which senses and follows a model board surface by means of first, second, third, and fourth terrain probes, with each of the terrain probes providing an analog signal which is proportional to the elevation sensed by the terrain probe. The terrain probes are connected in a unique combination with a pair of shift registers, with each shift register having a plurality of adjacent storage bits, and a computer. The computer, upon sampling the analog signals obtained from the terrain probes, calculates the pitch, roll, and heave of the carrier vehicle body being simulated by the terrain vehicle contour measuring and storage system.

20 Claims, 1 Drawing Figure

TERRAIN VEHICLE SIMULATOR CONTOUR MEASURING AND STORAGE DEVICE

BACKGROUND OF THE INVENTION

1. Field of the Invention

This invention relates generally to training vehicles. In particular, this invention relates to a vehicle training system which simulates the movement of a carrier vehicle across a terrain surface.

2. Description of the Prior Art

A wide variety of vehicle training systems are available for training military personnel in the handling of carrier vehicles. Such vehicle training systems generally employ a plurality of terrain probes, mounted on a control member, for producing signals in response to the movement of the control member across a terrain surface whose profile is being measured and followed. The signals produced by the plurality of terrain probes are fed into a computer which generates positional output signals to control the elevation and attitude movement of the control member across the terrain surface. Unfortunately, such prior art systems require one terrain probe for each wheel of the carrier vehicle being simulated by the vehicle training system. Accordingly, a vehicle training device is needed which will require the use of fewer terrain probes to duplicate the wheel configuration of the carrier vehicle being simulated by the vehicle training system.

SUMMARY OF THE INVENTION

The invention employs a quartet of terrain probes to sense the elevation of a terrain surface whose profile is being measured and followed. When a gantry, upon which the terrain probes are mounted, moves in the forward direction a left front and right front terrain probe sense the elevation of the terrain surface. Similarly, when the gantry moves in the reverse direction, a left rear and right rear terrain probe sense the elevation of the terrain surface. The analog output signals from the left front and left rear terrain probes are fed into a first shift register which has a plurality of adjacent storage bits, with each adjacent storage bit being a bucket brigade device. Similarly, the analog output signals from the right front and right rear terrain probes are fed into a second shift register. The number of adjacent storage bits of the first and second shift registers is determined by the carrier vehicle being simulated by the invention, with each storage bit representing a wheel of the simulated carrier vehicle. The analog signals stored in the first and second shift registers are then read into a computer which calculates the pitch, roll, and heave of the carrier vehicle being simulated by the invention.

DESCRIPTION OF THE PREFERRED EMBODIMENT

Figure 1:
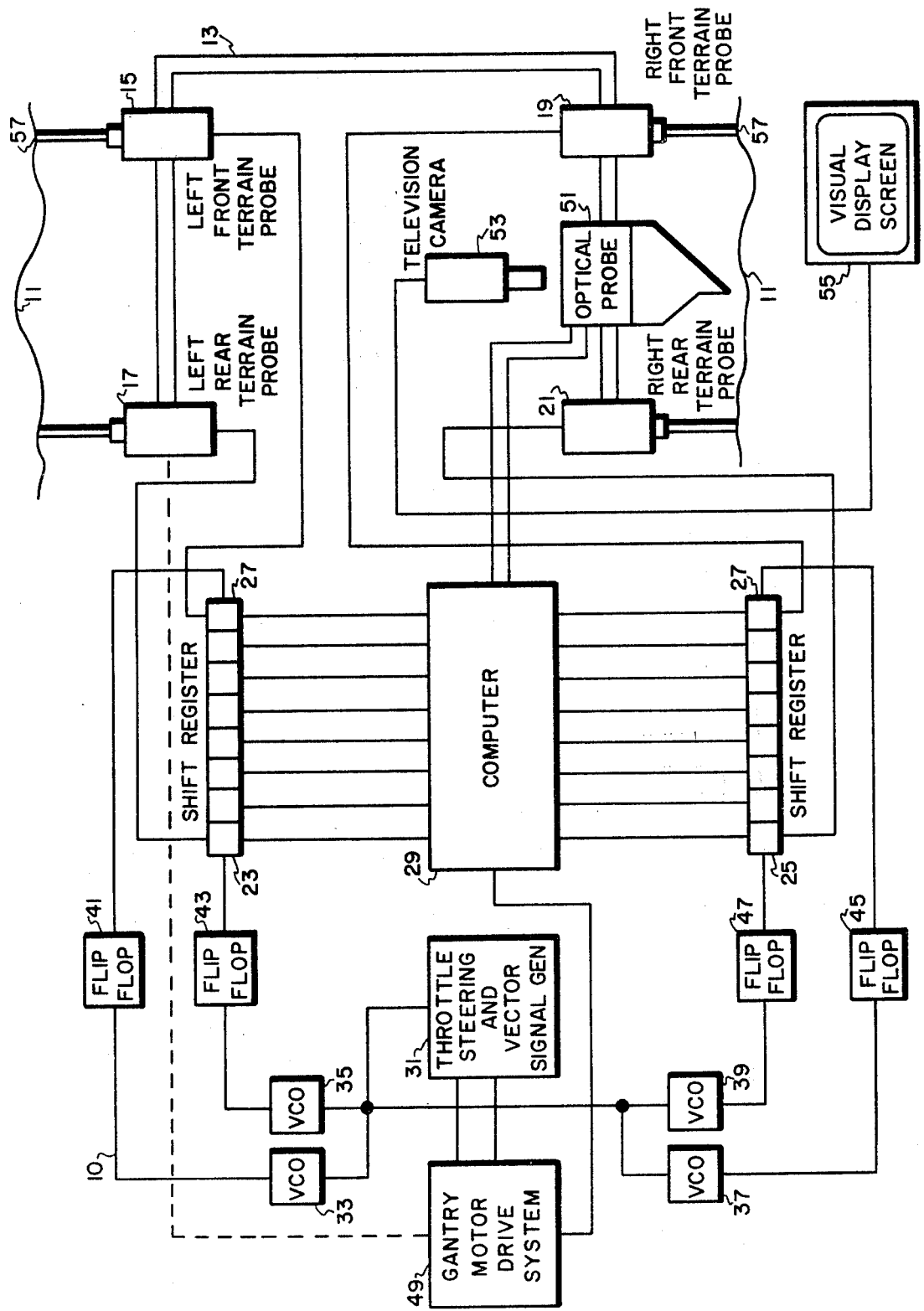
FIG. 1 is a schematic diagram of the invention.

The preferred embodiment of the subject invention will now be discussed in some detail in conjunction with the drawing, wherein like parts are designated by like reference numerals.

Referring to FIG. 1, there is shown a terrain vehicle contour measuring and storage system 10 which simulates a carrier vehicle, not shown, moving across a terrain surface 11, whose profile is being measured and followed. Terrain vehicle contour measuring and storage system 10 comprises a gantry 13 having a left front terrain probe 15, a left rear terrain probe 17, a right front terrain probe 19, and a right rear terrain probe 21 mounted on gantry 11. Terrain probes 15, 17, 19, and 21 may be any conventional and commercially available strain gages.

The output of terrain probe 15 is connected to the first input of a shift register 23, the output of terrain probe 17 is connected to the second input of shift register 23, the output of terrain probe 19 is connected to the first input of a shift register 25, and the output of terrain probe 21 is connected to second input of shift register 25. Shift registers 23 and 25 have a plurality of adjacent storage bits 27, with each storage bit 27 consisting of a bucket brigade device. The number of adjacent storage bits 27 included in shift registers 23 and 25 is determined by the wheel configuration and wheel spacing of the carrier vehicle, not shown, being simulated by terrain vehicle contour measuring and storage system 10. For example, if the carrier vehicle being simulated by terrain vehicle contour measuring and storage system 10 has sixteen evenly spaced wheels, shift registers 23 and 25 will be eight bit shift registers, with each shift register having eight adjacent storage bits 27. Further, if the spacing between the wheels of the carrier vehicle being simulated is uneven, additional adjacent storage bits 27 may be included in shift registers 23 and 25 to compensate for the uneven spacing of the wheels of the carrier vehicle being simulated.

Adjacent storage bits 27 are conventional bucket brigade devices and are commercially available from several different sources. In particular, it has been found that a 32 Stage Tapped Delay Bucket Brigade Device model TAD-32A, manufactured by the Reticon Corporation, performs quite satisfactorily as adjacent storage bits 27.

The outputs of adjacent storage bits 27 of shift register 23 are effectively connected in parallel to a first plurality of inputs of a computer 29. Similarly, the outputs of adjacent storage bits 27 of shift register 25 are connected in parallel to a second plurality of inputs of computer 29. Computer 29 is a Sigma Seven model computer manufactured by Xerox Corporation.

A throttle steering and vector signal generator 31 has one of its outputs connected to the input of a voltage controlled oscillator 33, the input of a voltage controlled oscillator 35, the input of a voltage controlled oscillator 37, and the input of a voltage controlled oscillator 39. The output of voltage controlled oscillator 33 is connected to the input of a flip-flop 41, the output of which is connected to the first clock input of shift register 23. And, the output of voltage controlled oscillator 35 is connected to the input of a flip-flop 43, the output of which is connected to the second clock input of shift register 23.

Similarly, the output of voltage controlled oscillator 37 is connected to the input of a flip-flop 45, the output of which is connected to the first clock input of shift register 25. Further, the output of voltage controlled oscillator 39 is connected to the input of a flip-flop 47, the output of which is connected to the second clock input of shift register 25.

Throttle steering and vector signal generator 31 may be any commercially available differential analyzer. However, it has been found that the differential analyzer named Turn Rate Unit for Mechanical Course Generator, manufactured by General Precision Laboratories, Inc., performs quite satisfactorily as throttle steering and vector signal generator 31. Further, voltage controlled oscillators 33, 35, 37, and 39 are of conventional design; and flip-flops 41, 43, 45, and 47 may be conventional Schmitt triggers.

The first and second outputs of throttle steering and vector signal generator 31 are respectively connected to the first and second inputs of a gantry motor drive system 49.

The third input of gantry motor drive system 49 is connected to one of the outputs of computer 29. Gantry motor drive system 49 is, in turn, mechanically connected to gantry 13.

Gantry motor drive system 49 includes three direct current variable speed motors, not shown, which are capable of delivery up to two horsepower. The three direct current motors drive gantry 13 across terrain surface 11 with the first direct current motor effectively functioning as an X-axis drive, the second direct current motor effectively functioning as a Y-axis drive, and the third direct current motor effectively functioning as a Z-axis drive. The three direct current variable speed motors of gantry motor drive system 49 are conventional and commercially available from several different sources.

An optical probe 51, which has a pitch input connected to the first output of computer 29, and a roll input connected to the second output of computer 29, is effectively mounted on gantry 13. A television camera 53 is spatially disposed from optical probe 51 and sighted on the lens output of optical probe 51. The output of television camera 53, in turn, is connected to a visual display screen 55.

Optical probe 51 is conventional and commercially available from Scan Optics, Inc. Similarly, visual display screen is of conventional design and commercially available from Ferrand Optics, Inc.

At this time, it is to be noted that all of the elements shown in FIG. 1, including those elements for which specific manufacturers have been listed, are well known, conventional, and commercially available.

The operation of the invention will now be discussed in conjunction with the drawing. For purposes of this analysis of the operation of terrain vehicle contour measuring and storage system 10, it will be assumed that gantry 13 is traveling in the forward direction. Operation of terrain vehicle contour measuring and storage system 10 in the reverse direction is identical, and for the sake of keeping this disclosure as simple as possible, will not be discussed in great detail.

As gantry 13 travels in the forward direction across terrain surface 11, terrain probes 15 and 19 sense the distance to terrain surface 11 and provide an analog signal whose magnitude is proportional to the terrain elevation sensed by terrain probes 15 and 19. The analog signal from left front terrain probe 15 is stored in shift register 23, and the analog signal from right front terrain probe 19 is stored in shift register 25. By selecting bucket brigade devices as storage bits 27 for shift registers 23 and 25, the analog signals received from terrain probes 15 and 19 may be read directly into shift registers 23 and 25, thus eliminating the need for digital to analog conversion circuits.

Throttle steering and vector signal generator 31 provides a direct current control signal whose magnitude is proportional to the velocity of gantry 13, and whose polarity is related to the direction of gantry 13. Thus, when gantry 13 is moving across terrain surface 11 in the forward direction, the direct current control signal's polarity is positive; and when gantry 13 is moving across terrain surface 11 in the reverse direction, the direct current control signal's polarity is negative. Further, the positive direct current control signal activates voltage controlled oscillators 33 and 37, while the negative direct current control signal activates voltage controlled oscillators 35 and 39.

As previously mentioned, the operation of terrain vehicle contour measuring and storage system 10 is being analyzed when gantry 13 is moving across terrain surface 11 in the forward direction. Therefore, only the operation of voltage controlled oscillator 33 in conjunction with flip-flop 41 and voltage controlled oscillator 37 in conjunction with flip-flop 45 will be discussed in detail. Voltage controlled oscillators 33 and 37 each generate a sine wave whose output frequency can be changed by varying the magnitude of the direct current control signal provided by throttle steering and vector signal generator 31. The sine waves generated by voltage controlled oscillators 35 and 39 are converted to square waves by flip-flops 41 and 45, with the square wave generated by flip-flop 41 being the clock signal for shift register 23, and the square wave generated by flip-flop 45 being the clock signal for shift register 25. Thus, the frequency of the clock signals generated by flip-flops 41 and 45 is directly proportional to the velocity of gantry 13 moving across terrain surface 11. Accordingly, the analog signal from terrain probe 15 shifts between adjacent storage bits 27 of shift register 23 at a frequency which is directly proportional to the velocity of gantry 13. Similarly, the analog signal from terrain probe 19 shifts between adjacent storage bits 27 of shift register 25 at a frequency which is directly proportional to the velocity of gantry 13.

As discussed previously, the number of adjacent storage bits 27 included in shift registers 23 and 25 is determined by the wheel configuration and wheel spacing of the carrier vehicle being simulated by terrain vehicle contour measuring and storage system 10. Further, as mentioned above and for the purposes of illustration, if the carrier vehicle being simulated has sixteen evenly spaced wheels, shift registers 23 and 25 will be eight-bit shift registers. Thus, as each wheel of the simulated carrier vehicle effectively passes over a reference point 57 of surface 11, the analog signals provided by terrain probes 15 and 19 are shifted between adjacent storage bits 27 of shift registers 23 and 25. Accordingly, after flip-flop 41 has provided eight clock pulses to shift register 23, and after flip-flop 45 has provided eight clock pulses to shift register 25, the carrier vehicle being simulated by terrain vehicle contour measuring and storage system 10 will have moved one vehicle length and thus have completely traversed reference point 57 of surface 11.

Thus, it may be seen that the eight adjacent storage bits 27 of shift registers 23 correspond to the eight wheels on the left side of the simulated carrier vehicle. Similarly, the eight adjacent storage bits 27 of shift register 25 correspond to the eight wheels on the right side of the simulated carrier vehicle. Further, by using terrain probes 15 and 19 in conjunction with shift registers 23 and 25, terrain contour measuring and storage system 10 can effectively duplicate the wheel configuration and wheel spacing of any simulated carrier vehicle, moving in the forward direction, depending upon the number of adjacent storage bits 27 comprising shift registers 23 and 25. Also, by using terrain probes 17 and 21 in conjunction with shift registers 23 and 25, terrain contour measuring and storage system 10 can effectively duplicate the wheel configuration and wheel spacing of any simulated carrier vehicle moving in the reverse direction.

Computer 29 is programmed to sample the analog signals stored in shift registers 23 and 25. Thus, for the sixteen wheel simulated carrier vehicle discussed above, the analog signals, which represent the terrain elevation of surface 11, can be read into computer 29 at predetermined time intervals as gantry 13 moves across surface 11. Further, computer 29 is programmed with the motion equations of the carrier vehicle being simulated, thereby enabling computer 29 to compute the pitch, roll and heave of the simulated carrier vehicle.

As discussed previously, gantry motor drive system 49 includes three direct current variable speed motors, not shown, which drive gantry 13 across terrain surface 11. Throttle steering and vector signal generator 31 generates an X-axis control signal and Y-axis control signal, while computer 29 provides a Z-axis control signal which is proportional to the heave of the carrier vehicle being simulated. The X-axis control signal, whose magnitude is equal to the X component of the velocity vector of gantry 13, regulates the speed and direction of the first direct current motor, which effectively functions as the X-axis drive. Similarly, the Y-axis control signal, whose magnitude is equal to the Y component of the velocity vector of gantry 13, regulates the speed and direction of the second direct current motor, which effectively functions as the Y-axis drive. Further, the Z-axis control signal regulates the speed and direction of the third direct current motor which effectively functions as a Z-axis drive.

A pitch control signal and a roll control signal, generated by computer 29, are fed back to optical probe 51, thus enabling optical probe 51 to provide a visual image of terrain surface 11 which accounts for both the pitch and roll motions of the carrier vehicle being simulated by terrain vehicle contour measuring and storage system 10. Television camera 53 monitors the visual image of surface 11 provided by optical probe 51, with the output signal from television camera 53 being fed to visual display screen 55. Visual display screen 55, in turn, enables a trainee to observe terrain surface 11 as gantry 13 moves across terrain surface 11.

From the foregoing description, it may readily be seen that the subject invention comprises a new, unique, and exceedingly useful ground vehicle simulator which constitutes a considerable improvement over the prior art. Obviously, many modifications and variations of the present invention are possible in light of the above teachings. It is, therefore, to be understood that within the scope of the appended claims the invention may be practiced otherwise than as specifically described.

What is claimed is:

1. A terrain vehicle contour measuring and storage system for vehicle simulating apparatus, comprising in combination:
   first, second, third and fourth terrain probe means, each of which has an output, and each of which is effectively adapted for sensing the distance to a terrain surface whose profile is being measured and followed, and for providing an analog signal whose magnitude is proportional to the elevation sensed thereby;
   carrier vehicle means, having said first, second, third, and fourth terrain probe means effectively mounted thereon, and having first, second, and third control signal inputs for moving the quartet of terrain probes across said terrain surface whose profile is being measured and followed;
   vector signal generator means, having a first control signal output connected to the first control signal input of said carrier vehicle means, a second control signal output connected to the second control signal input of said carrier vehicle means, and a third control signal output for providing a direct current control signal having a magnitude proportional to the velocity of said carrier vehicle means, an X-axis control signal, and a Y-axis control signal;
   clock signal generator means, having a control signal input connected to the third control signal output of said vector signal generator means, and first, second, third, and fourth clock outputs for providing first, second, third and fourth clock signals whose frequencies are proportional to the magnitude of said direct current control signal;
   means having first, second, third, and fourth data inputs respectively connected to the outputs of said first, second, third, and fourth terrain probe means; first, second, third, and fourth clock inputs respectively connected to the first, second, third, and fourth clock outputs of said clock signal generator means; and a plurality of data outputs for storing the analog signals received from said first, second, third, and fourth terrain probe means;
   computer means, having a plurality of data inputs effectively connected to the plurality of data outputs of said storage means, a first control signal output, a second control signal output, and a third control signal output effectively connected to the third control signal input of said vector signal generator means for performing an analysis of the analog signals provided by said first, second, third, and fourth terrain probe means to determine the simulated pitch, roll, and heave of said terrain vehicle contour measuring and storage system, and for providing a Z-axis control signal, a roll control signal, and a pitch control signal.

2. The terrain vehicle contour measuring and storage system according to claim 1, wherein each of said quartet of terrain probe means comprises a strain gage.

3. The terrain vehicle contour measuring and storage system according to claim 1, wherein said terrain surface whose profile is being measured and followed comprises a model board surface.

4. The terrain vehicle contour measuring and storage system according to claim 1, wherein said carrier vehicle means comprises a gantry.

5. The terrain vehicle contour measuring and storage system according to claim 1, wherein said carrier vehicle means comprises:
   a gantry drive motor system having a first control signal input connected to the first control signal output of said vector signal generator means, a second control signal input connected to the second control signal output of said vector signal generator means, a third control signal input connected to the third control signal output of said computer means, and a drive output; and
   a gantry having an input effectively connected to the drive output of said gantry drive motor system.

6. The terrain vehicle contour measuring and storage system according to claim 1, wherein said clock signal generator means comprises:
   a first voltage controlled oscillator having an input effectively connected to the third control signal output of said vector signal generator means, and an output;
   a first flip-flop having an input connected to the output of said first voltage controlled oscillator;
   a second voltage controlled oscillator having an input effectively connected to the third control signal output of said vector signal generator means, and an output;
   a second flip-flop having an input connected to the output of said second voltage controlled oscillator;
   a third voltage controlled oscillator having an input effectively connected to the third control signal output of said vector signal generator means, and an output;
   a third flip-flop having an input connected to the output of said third voltage controlled oscillator;
   a fourth voltage controlled oscillator having an input effectively connected to the third control signal output of said vector signal generator means, and an output; and
   a fourth flip-flop having an input connected to the output of said fourth voltage controlled oscillator.

7. The terrain vehicle contour measuring and storage system according to claim 6, wherein said first, second, third, and fourth flip-flops are Schmitt triggers.

8. The terrain vehicle contour measuring and storage system according to claim 1, wherein said storage means comprises:
   a first shift register having a plurality of adjacent storage bits, and having a first data input connected to the output of said first terrain probe means, a second data input connected to the output of said second terrain probe means, a first clock input connected to the first clock output of said clock signal generator means, and a second clock input connected to the second clock output of said clock signal generator means; and
   a second shift register having a plurality of adjacent storage bits, and having a first data input connected to the output of said third terrain probe means, a second data input connected to the output of said fourth terrain probe means, a first clock input connected to the third clock output of said clock signal generator means, and a second clock input connected to the fourth clock output of said clock signal generator means.

9. The terrain vehicle contour measuring and storage system according to claim 8, wherein said plurality of adjacent storage bits of said first and second shift registers are bucket brigade devices.

10. The terrain vehicle contour measuring and storage system according to claim 1, wherein said computer means comprises a digital computer.

11. The terrain vehicle contour measuring and storage system according to claim 1, further characterized by:
   an optical probe mounted on said gantry, said optical probe having a pitch input connected to the first control signal output of said computer means, a roll input connected to the second control signal output of said computer means, and a lens output for providing a visual image of said terrain surface whose profile is being measured and followed;
   a television camera spatially disposed from said optical probe and sighted on the lens output of said optical probe; and
   a visual display screen having an input effectively connected to the output of said television camera for viewing the visual image of said terrain surface provided by said optical probe.

12. A terrain vehicle contour measuring system for vehicle simulating apparatus, comprising in combination:
   a left front terrain probe having an output for sensing the distance to a terrain surface whose profile is being measured and followed, and for providing a first analog signal proportional to the elevation sensed by said left front terrain probe;
   a left rear terrain probe having an output adapted for sensing the distance to said terrain surface whose profile is being measured and followed, and for providing a second analog signal proportional to the elevation sensed by said left rear terrain probe;
   a right front terrain probe having an output adapted for sensing the distance to said terrain surface whose profile is being measured and followed, and for providing a third analog signal proportional to the elevation sensed by said right front elevation probe;
   a right rear terrain probe having an output adapted for sensing the distance to said terrain surface whose profile is being measured and followed, and for providing a fourth analog signal proportional to the elevation sensed by said right rear terrain probe;
   a gantry having said left rear, left front, right rear, and right front terrain probes effectively mounted thereon;
   a throttle steering and vector signal generator having first, second, and third outputs for providing a direct current control signal having a magnitude proportional to the velocity of said gantry, an X-axis control signal, and a Y-axis control signal;
   a first voltage controlled oscillator having an input connected to the third output of said throttle steering and vector signal generator, and an output;
   a first flip-flop circuit having an input connected to the output of said first voltage controlled oscillator, and an output for generating a first predetermined clock signal having a frequency proportional to the magnitude of said direct current control signal;
   a second voltage controlled oscillator having an input connected to the third output of said throttle steering and vector signal generator, and an output;
   a second flip-flop circuit having an input connected to the output of said second voltage controlled oscillator and an output for generating a second predetermined clock signal having a frequency proportional to the magnitude of said direct current control signal;
   a third voltage controlled oscillator having an input connected to the third output of said throttle steering and vector signal generator and an output;
   a third flip-flop circuit having an input connected to the output of said third voltage controlled oscillator and an output for generating a third predetermined clock signal having a frequency proportional to the magnitude of said direct current control signal;

a fourth voltage controlled oscillator having an input connected to the third output of said throttle steering and vector signal generator and an output;

a fourth flip-flop circuit having an input connected to the output of said fourth voltage controlled oscillator and an output for generating a fourth predetermined clock signal having a frequency proportional to the magnitude of said direct current control signal;

a first storage register having a first input connected to the output of said left front terrain probe, a second input connected to the output of said left rear terrain probe, a first clock input connected to the output of said first flip-flop circuit, a second clock input connected to the output of said second flip-flop circuit and a plurality of outputs for receiving said first and second analog signals provided by said left front and left rear terrain probes and for shifting said first and second analog signals in response to either said first or said second predetermined clock signal;

a second storage register having a first input connected to the output of said right front terrain probe, a second input connected to the output of said right rear terrain probe, a first clock input connected to the output of said third flip-flop circuit, a second clock input connected to the output of said fourth flip-flop circuit, and a plurality of outputs for receiving said third and fourth analog signals provided by said right front and right rear terrain probes and for shifting said third and fourth analog signals in response to either said third or said fourth predetermined clock signal;

a computer system having a plurality of first inputs effectively connected to the plurality of outputs of said first storage register; a plurality of second inputs effectively connected to the plurality of outputs of said second storage register; and first, second, and third outputs for performing an analysis of said first, second, third, and fourth analog signals to determine the simulated pitch, roll, and heave of said terrain vehicle contour measuring system, and for providing a Z-axis control signal, a roll control signal, and a pitch control signal; and a gantry drive motor system having a first input connected to the first output of said throttle steering and vector signal generator, a second input connected to the second input connected to the second output of said throttle steering and vector signal generator, a third input connected to the third output of said computer system, and a drive output effectively connected to said gantry for moving said gantry across a predetermined path on said terrain surface whose profile is being measured and followed.

13. The terrain vehicle contour measuring system according to claim 12, wherein said left front, left rear, right front, and right rear terrain probes are strain gages.

14. The terrain vehicle contour measuring system according to claim 12, wherein said first, second, third, and fourth flip-flop circuits are multivibrators.

15. The terrain vehicle contour measuring system according to claim 12, wherein said first, second, third, and fourth flip-flop circuits are Schmitt triggers.

16. The terrain vehicle contour measuring system according to claim 12, wherein said first and second storage registers are shift registers with each of said shift registers having a plurality of adjacent storage bits.

17. The terrain vehicle contour measuring system according to claim 16, wherein said plurality of adjacent storage bits of said first and second shift registers are bucket brigade devices.

18. The terrain vehicle contour measuring system according to claim 12, wherein said throttle steering and vector signal generator comprises a differential analyzer.

19. The terrain vehicle contour measuring system according to claim 12, wherein said terrain surface whose profile is being measured and followed comprises a model board surface.

20. The terrain vehicle contour measuring system according to claim 12, further characterized by:

an optical probe mounted on said gantry, said optical probe having a pitch input connected to the first output of said computer system, a roll input connected to the second output of said computer system, and lens output for providing a visual image of said terrain surface whose profile is being measured and followed;

a television camera spatially disposed from said optical probe and sighted on the lens output of said optical probe; and a visual display screen having an input effectively connected to the output of said television camera for viewing the visual image of said terrain surface provided by said optical probe.

* * * * *